United States Patent Office.

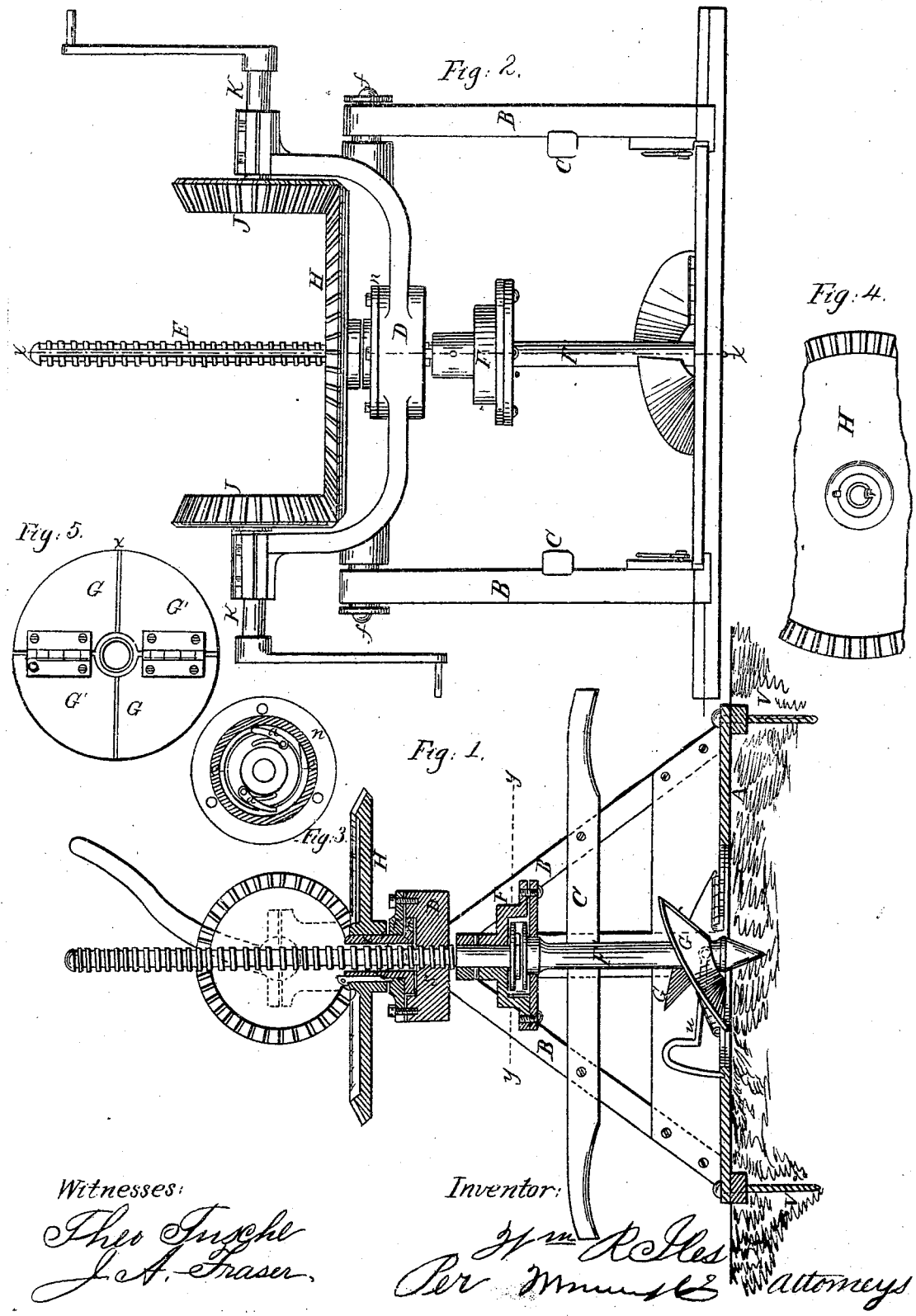

WILLIAM R. ILES, OF WEST RUSHVILLE, OHIO.

Letters Patent No. 72,497, dated December 24, 1867.

---

IMPROVED MACHINE FOR BORING POST-HOLES.

---

*The Schedule referred to in these Letters Patent and making part of the same.*

---

TO ALL WHOM IT MAY CONCERN:

Be it known that I, WILLIAM R. ILES, of West Rushville, in the county of Fairfield, and State of Ohio, have invented a new and useful Improvement in Machine for Boring Post-Holes; and I do hereby declare that the following is a full, clear, and exact description thereof, which will enable others skilled in the art to make and use the same, reference being had to the accompanying drawings, forming part of this specification.

This invention relates to a new and improved machine for boring post-holes in the earth, and the invention consists in operating an upright shaft by cranks and gearing, in the manner hereinafter described.

Figure 1 is a central sectional elevation of the machine through the line $x\ x$, fig. 2.

Figure 2 is a side elevation of the machine, showing the gearing and the shaft or spindle, and the cranks by which the machine is operated.

Figure 3 is a horizontal section through the line $y\ y$ of fig. 1.

Figure 4 shows a section of the horizontal gear-wheel.

Figure 5 is a top view of the cutting-bits and valves on the end of the spindle.

Similar letters of reference indicate corresponding parts.

This machine is supported on a platform, of suitable size, by upright stands, to which handles are attached, by which the machine is carried. A represents the platform; B, the upright stands; C, the handles; D is a bracket, of cast iron, or some other suitable material, which has journals at each end, which rest in boxes upon the top ends of the stands B. By this bracket the gear-wheels are supported, and the centre of it forms a nut for the screw on the shaft or spindle. E is the spindle, which is of suitable length for the purpose intended, and which has a screw-thread cut upon it, as seen in the drawing. The spindle is in two parts, which are coupled together, as seen at F, in figs. 1 and 3. G represents the cutting-bits, on the end of the lower part of the spindle, which lower part is marked F'. This coupling F is what is called a "snap-coupling," the arrangement being such that when the spindle is turned in one direction, the lower part F' turns with E. This is when the machine is boring and the spindle descending. When the spindle is thus descending, the spring pawls $a\ a$, (seen in fig. 3,) engage with the shoulders $c\ c$, in the coupling. But when the spindle E is turned in an opposite direction, the pawls will not so engage, but slip past the shoulders, and the consequence is that the cutters, with the valve, being loaded with earth, &c., will be raised by the screw from the bottom of the hole without being revolved. H is the main gear-wheel, which is driven by the pinions J J on the crank-shaft K, as seen in fig. 2. This gear-wheel H is attached to a sleeve, $i$, (seen in section in fig. 1,) which sleeve is secured to the centre of the bracket D by a collar, $m$, and cap $n$, as seen in the drawing. $o$ is a key, by which the wheel is fastened to the sleeve. As seen in fig. 2, the spindle E has a longitudinal slot, $p$, cut in it, and the sleeve $i$ has a feather, as seen at $r$, fig. 4, so that as the spindle is turned by the gear, the spindle, being carried round by the feather, passes up and down through the sleeve as it is fed down or drawn upward by the nut and screw.

As before stated, the nut is in the centre of the bracket at S. The two bits G G have valves or wings hinged to them, which are marked G', which rise as the boring proceeds, so as to let the earth and stones pass up, but which close down when the bit and spindle are raised, or the motion reversed, to clear the hole. As the machine will not always stand on level ground when in use, the pivots or journals on the bracket D, (seen at $f\ f$,) allow the spindle to be placed at any desired inclination or angle, so as to bore a vertical hole on a side-hill if desired. T represents a slide on the platform A, with an aperture in its centre for the passage of the bits G. This slide is adjustable, so as to be a guide for the bit, and it is held in the desired position by hooks $u$, which are attached to the inner sides of the stands B. V indicates pins, which are forced into the earth by the weight of those who operate the machine or otherwise, which keeps the machine steady while it is in operation.

Having thus described my invention, what I claim as new, and desire to secure by Letters Patent, is—

1. The bracket D, suspended on the journals $f\ f$, in combination with the gear-wheels, substantially as described.

2. The hinged valves or wings G', in combination with the cutting-bits, substantially as shown and described.

WILLIAM R. ILES.

Witnesses:
CHARLES V. HODGE,
AMOS L. HARMAN.